United States Patent [19]

Jones

[11] 3,928,904

[45] Dec. 30, 1975

[54] FASTENING DEVICE

[76] Inventor: Sterling B. Jones, 858 Duff Ave., West Covina, Calif. 91790

[22] Filed: Feb. 28, 1975

[21] Appl. No.: 554,153

[52] U.S. Cl. .......................... 29/436; 29/526; 85/81
[51] Int. Cl.² ........................................... F16B 13/06
[58] Field of Search ...... 85/81, 5 M, 5 E; 24/211 R; 29/434, 436, 526

[56] References Cited
UNITED STATES PATENTS

| | | | |
|---|---|---|---|
| 2,386,967 | 10/1945 | Mancini | 85/81 |
| 2,397,892 | 4/1946 | VanSittert | 85/81 |
| 2,463,731 | 3/1949 | Whalen | 85/81 |
| 2,697,960 | 12/1954 | Walsh et al. | 85/5 E |
| 3,096,679 | 7/1963 | Jones | 85/81 |

FOREIGN PATENTS OR APPLICATIONS

| | | | |
|---|---|---|---|
| 547,586 | 9/1942 | United Kingdom | 85/5 M |

*Primary Examiner*—Marion Parsons, Jr.
*Attorney, Agent, or Firm*—Robert E. Geauque

[57] ABSTRACT

A fastening device which employs a pair of spreadable pins which are mounted within a cap. Each pin terminates in an enlarged head. The pins are positioned within a tubular housing with the enlarged heads of the pins extending through an aperture in a closed end of the tubular housing. A spreader bar is positioned between the spreadable pins and functions to separate the pins a small distance apart. The aft end of each enlarged head includes a shoulder which is to contact a workpiece unit and bind the workpiece unit between the shoulders and the enclosed end of the tubular body portion. A compressible spring is placed around the spreadable pins with the foremost coil of the spring cooperating within a pair of slots formed in opposite sides of the spreader bar. The back end of the spring is in contact with the cap which is telescopingly received within the tubular body portion.

6 Claims, 5 Drawing Figures

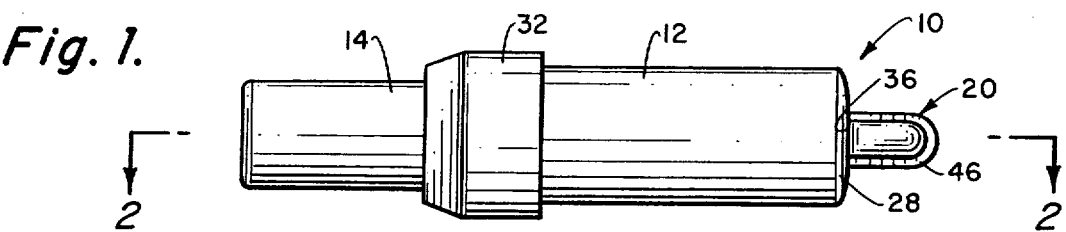
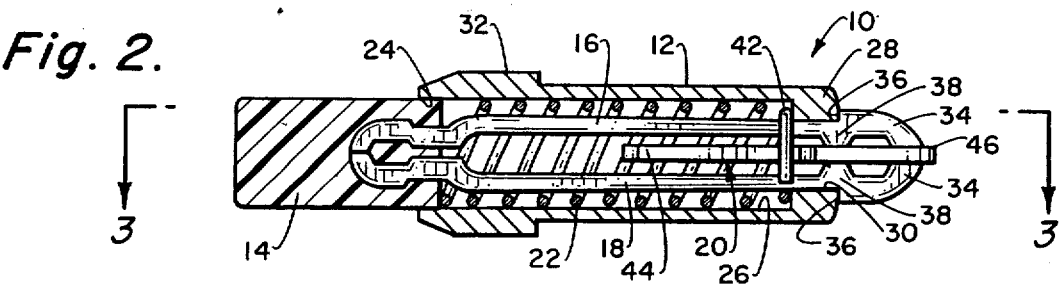
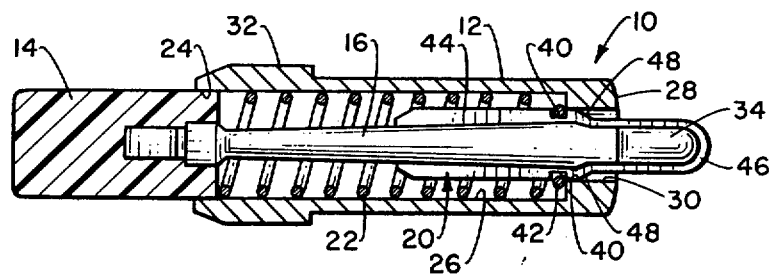
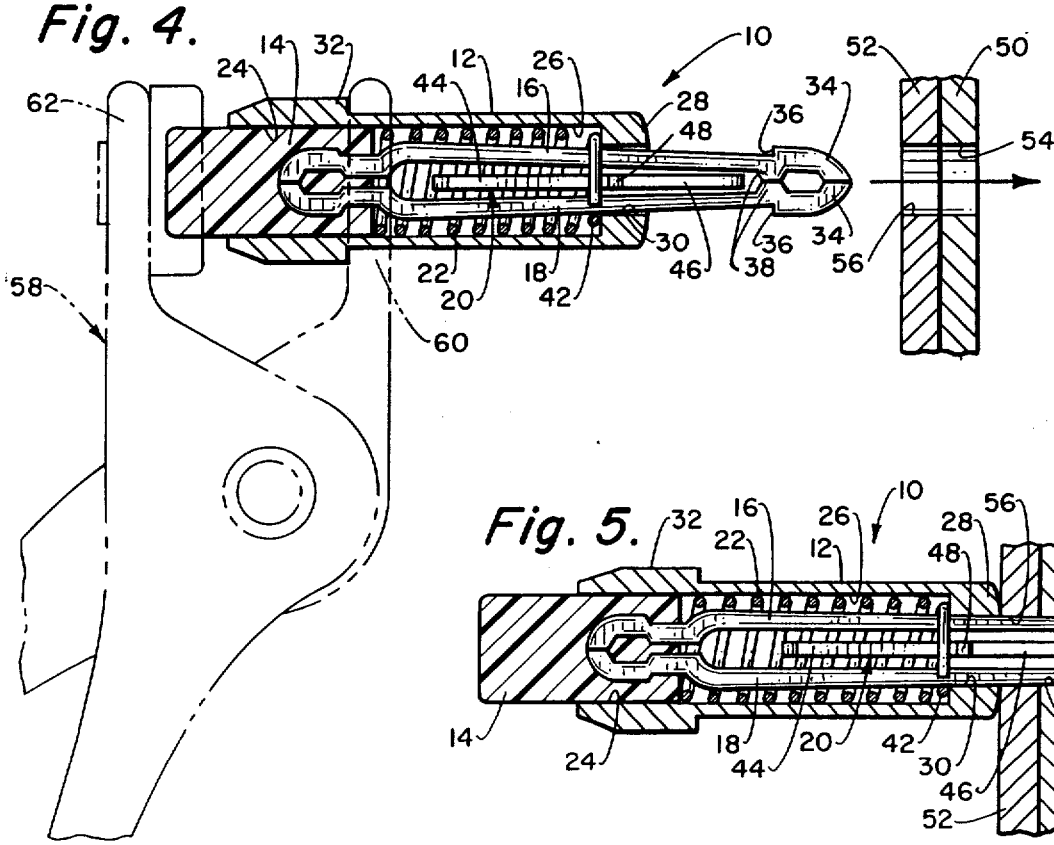

FASTENING DEVICE

BACKGROUND OF THE INVENTION

In the assembly of sheet metal plates particularly in the aircraft industry, there is a need for holding the plates during the assembly operation. A common type of fastening device used previously for this purpose employs a pair of spreadable pins which are inserted through aligned apertures in the plates and then the pins are permitted to expand slightly and exert a binding action between the heads of the pins and the housing of the fastener. This holds the established position of the plates and also keeps the plates together.

Previously, such fasteners have been constructed of a substantial number of parts. The complex construction of such types of fasteners have greatly increased the manufacturing costs. The manufacture of such fasteners is a highly competitive industry. A competitive advantage by producing a satisfactory type of fastener at lower cost is a significant competitive advantage.

SUMMARY OF THE INVENTION

The fastener of this invention is produced with a minimum number of parts with some of the parts assuming multiple functions where heretofore separate parts were employed for each individual function. The fastener of this invention has been so designed as to greatly facilitate assembling and thereby substantially decreasing labor costs in the assembling of such fasteners.

The fastening device of this invention is composed of a total number of six parts. The spreadable pins are attached to a cap so that the pins are biased toward each other. Each pin includes an enlarged head with a shoulder being formed at the back of each head. Formed on the inside of each pin adjacent each head is an inwardly directed protuberance. A spreader bar is to be employed between the pins and once the bar comes between the pair of inwardly directing protuberances, the pins are spread apart a predetermined distance. The spreader bar includes a pair of slots formed on opposite sides. A coil spring is to be employed about the pins with one end of the spring in contact with the cap. The foremost coil of the spring, the coil which is nearest the enlarged heads of the pins, is formed slightly smaller then the remaining coils in the spring. The length of the spring is selected so that, when at rest and the back end of the spring in contact with the cap, the foremost coil is located about one-eighth of an inch away from the shoulders of the enlarged heads. The length of the spreader bar is about one quarter inch less than the length of the coil spring.

The method of assembly requires that the spreader bar be placed between the pins but not be located between the inwardly directed protuberances. The coil spring is then placed over the pins and the spreader bar until the aft end of the spring comes into contact with the cap. A butular housing is employed which has an open end and a closed end, an aperture located in the closed end. The pin assembly is then inserted within the tubular housing until the enlarged heads protrude through the aperture in the closed end. The diameter of the aperture is just slightly larger than the total width of the enlarged heads so that the heads are permitted to freely pass therethrough. A collar is externally formed on the aft end of the housing.

The overall unit is then placed within a pliers type of tool so that the one portion of the pliers abuts the collar and the other portion of the pliers cooperates with the end of the cap. A compressing action by the pliers causes the spring to be compressed with the foremost coil coming into contact with the interior of the closed end of the housing. The spreadable pins are extended through the aperture in the housing. The spreader bar is forced by the cap to protrude through the aperture. The spring is being held against the closed end of the housing with the spreader bar being forced to move with the result that the foremost coil of the spring, which is of a smaller diameter, "snaps" within the pair of slots formed in the spreader bar when the cap is completely depressed with respect to the housing. At this point, the spreader bar is attached to the foremost coil of the spring. Upon housing. Thereby complete retraction of the pins to within the housing is prevented with the shoulders coming into contact with the front end of the housing. Since the cap is attached to the pins, complete removal of the cap from within the housing is prevented. As a result, a completely assembled single unit is formed and ready for use.

BRIEF DESCRIPTION OF THE DRAWING

FIG. 1 is a side, longitudinal view of the fastening device formed in accordance with this invention;

FIG. 2 is a cross-sectional view of the fastening device of this invention taken along line 2—2 of FIG. 1;

FIG. 3 is a cross-sectional view of the fastening device of this invention taken along line 3—3 of FIG. 2;

FIG. 4 is a view similar to FIG. 2, but showing the fastening device in the extended position; and FIG. 5 is a view similar to FIG. 4, but showing the fastening device cooperating with the workpiece unit.

DETAILED DESCRIPTION OF THE SHOWN EMBODIMENT

Referring in particular to the drawing, there is shown the fastening device 10 of this invention which is composed generally of a tubular housing 12, a cap 14, spreadable pins 16 and 18, a spreader bar 20 and a coil spring 22. The housing 12 can be formed of any rigid material and will normally be constructed of aluminum or steel. The housing 12 includes an open end 24 which provides access into an interior chamber 26 which is closed by closed end 28. An aperture 30 is centrally located within the closed end 28. The shape of the housing 12 is substantially cylindrical, however it is envisioned that the housing 12 could be made in shapes other than a cylinder.

Exteriorly formed upon the housing 12 adjacent the aft end of the housing 12 is a collar 32. The function of the collar has been explained previously within the summary of the invention and will also be reiterated further on in the specification.

The aft end of the spreadable pins 16 and 18 are fixedly mounted within the cap 14. The cap 14 will normally comprise a solid mass of material such as plastic or the like. The spreadable pins 16 and 18 are mounted in the cap 14 so that such are under a continuous bias toward each other. The diameter of the cap 14 is such that it telescopingly fits within the open end 24 and the chamber 26.

Each of the spreadable pins includes an enlarged head 34. The forward end of the enlarged head is smoothly contoured into a substantially rounded configuration in order to facilitate the location of the fastening device of this invention during use. The aft end of each of the enlarged heads terminates in a shoulder 36.

Formed interiorly of each enlarged head 34 and substantially in alignment with the shoulders 36 is an inwardly directed protuberance 38. When the pins 16 and 18 are in contact with each other, the protuberances 38 are in contact with each other as well as the nose portions of each of the enlarged heads 34.

The spreader bar 20 is formed of rigid sheet material of steel, aluminum or the like. The spreader bar 20 includes a pair of slots 40.

The coils of the coil spring 22 are all of the same diameter with the exception of the foremost coil 42. Teh foremost coil 42 is of a slightly smaller diameter then the other coils within the spring 22. The spreader bar 20 is divided into an enlarged aft section 44 and a smaller fore section 46. The size of the fore section 46 is so that it can readily pass through all coils of the coil spring, even the foremost coil. The size of the aft section 44 is such that it is capable of passing through all the coils of the coil spring with the exception of the foremost coil. The slots 42 are formed in the front portion of the aft section 44. The slots 42, in essence, make the width of the spreader bar in that area approximately equal in width to the fore section 46. Just forward of the slots 42 are inclined camming surfaces 48. The spreader bar 20 is capable of being forced so that the foremost coil 42 rides up the inclined camming surfaces 48 and snaps into cooperation with the pair of slots 40. At this time, the spreader bar 20 is fixedly positioned with respect to the foremost coil 42 of the coil spring 22.

The method of assembly of the fastening device 10 of this invention is believed to have been previously adequately described within the summary of the invention and reference is to be had thereto.

The use of the fastening device of this invention is as follows: The fastening device 10 of this invention is to be employed to connect together a plurality of separate plates, such as plates 50 and 52 of a workpiece unit. The plates 50 and 52 are to each have an aperture 54 and 56, respectively. The apertures 54 and 56 are to be aligned as shown in FIG. 4. A pliers 58 is employed which have a bifurcated portion 60 and a recessed portion 62. The bifurcated portion 60 is placed about the housing 12 and against the collar 32. The recessed portion 62 is placed in contact with the end of the cap 14. A person then manually moves the cap 14 with respect to the housing 12 compressing spring 22 until the enlarged heads 34 are moved out of association with the spreader bar 20. This position is shown in FIG. 4 of the drawing. The person then places the enlarged heads 34 of the spreadable pins 16 and 18 through the aligned apertures 54 and 56. The cap 14 is then released which causes retraction of the pins to once again come into contact with the spreader bar 20 and expand. The portion of the plate 50 about the hole 54 comes into contact with the shoulders 36. A binding together of the plates 50 and 52 occurs between the shoulders 36 and the closed end 28 of the housing 12.

In order to affect release of the fastening device 10 of this invention, the opposite procedure is accomplished.

What is claimed is:

1. A fastening device comprising:
   a body portion having an open end and a closed end;
   an aperture in said closed end of said body portion;
   a cap means telesocpingly mounted within said open end;
   spreadable pin means mounted in said body portion, said pin means comprising a pair of spreadable pins each having an enlarged head extending through said aperture and a shank extending out said open top, a shoulder formed at the aft end of each of said enlarged heads, the base of each said spreadable pins being mounted within said cap and under continuous bias toward each other;
   a spreader bar located between said spreadable pins, said spreader bar having connecting means formed thereon;
   a compressible spring having coils encompassing said spreadable pin means in said body portion and extending out said open top, said compressible spring means having a foremost coil which is located nearest said enlarged heads, said foremost coil being connectable with said connecting means, the aft end of said spring to contact said cap; and
   whereby as said spreader bar is moved between said enlarged heads said spreader pins spread apart thereby being capable of binding together a workpiece unit between said housing and said shoulders.

2. The fastening device as defined in claim 1 wherein:
   said foremost coil being of a smaller diameter than the other of said coils within said compressible spring.

3. The fastening device as defined in claim 1 wherein:
   said connecting means comprises a pair of slots formed on opposite sides of said spreader bar, whereby said foremost coil being of such a diameter to cooperate within said slots.

4. A method of making a fastening device comprising the steps of:
   forming a tubular housing having an open end and a closed end;
   forming an aperture in said closed end;
   inserting the base of a pair of spreadable pins within a cap so said pins are under continuous bias toward each other;
   locating a spreader bar between said pins aft of the head area of said pins;
   locating a compressible spring about said spreadable pins between said cap and said closed end;
   placing said spreadable pins within said tubular housing with the head area of said pins to extend through said aperture;
   forcibly moving said cap within said open end causing said spreader bar to move between the head area of said pins causing securing of said spring to a connection means formed on said spreader bar; and
   releasing said cap resulting in said cap being retained within said housing by the head area of said pins not being movable back through said aperture due to said spreader bar being located between the head area of said pins.

5. The method as defined in claim 4 wherein: just prior to the second locating step;
   employing a coil spring with a smaller diameter foremost coil.

6. The method as defined in claim 4 wherein the step of securing the spring to the connecting means comprises:
   employing a slot means as said connecting means resulting in said smaller diametered foremost coil cooperating within said slot means.

\* \* \* \* \*